United States Patent [19]

Goodman et al.

[11] 4,316,597

[45] Feb. 23, 1982

[54] COMPACT VALVE ACTUATOR

[75] Inventors: Robert B. Goodman, West Hartford; Charles C. Seger, West Suffield, both of Conn.

[73] Assignee: United Technologies Corporation, Hartford, Conn.

[21] Appl. No.: 115,304

[22] Filed: Jan. 24, 1980

[51] Int. Cl.[3] .......... F16K 31/122

[52] U.S. Cl. .......... 251/58; 92/108; 92/152; 251/63.6

[58] Field of Search .......... 91/417 R, 519; 92/108, 92/152, 153, 155; 251/58, 62, 63, 63.6, 229, 61.4

[56] References Cited

U.S. PATENT DOCUMENTS

| | | | |
|---|---|---|---|
| 550,785 | 12/1895 | Friend | 92/152 |
| 560,920 | 5/1896 | Parker | 92/152 |
| 1,509,000 | 9/1924 | Simpson | 92/108 |
| 1,832,618 | 11/1931 | Conklin | 92/152 |
| 2,296,145 | 9/1942 | Christensen | 251/63.6 |
| 2,449,930 | 9/1948 | Davey | 92/155 |
| 2,664,859 | 1/1954 | Green | 92/108 |
| 3,525,289 | 8/1970 | Cercone | 92/98 D |
| 3,563,136 | 2/1971 | Valente | 91/519 |
| 3,757,640 | 9/1973 | Karol | 91/417 R |
| 3,811,677 | 5/1974 | Mayer | 91/519 |
| 3,824,901 | 7/1974 | Shafer | 92/152 |
| 3,839,946 | 10/1974 | Paget | 92/153 |
| 3,958,493 | 5/1976 | Fujita et al. | 92/152 |

FOREIGN PATENT DOCUMENTS

| | | | |
|---|---|---|---|
| 1150588 | 6/1963 | Fed. Rep. of Germany | 92/108 |
| 1193898 | 6/1965 | Fed. Rep. of Germany | 92/108 |

*Primary Examiner*—George L. Walton

*Attorney, Agent, or Firm*—John Swiatocha

[57] ABSTRACT

A compact valve actuator for operating a valve of the butterfly type or the like. The actuator comprises a pair of joined pistons which respond by simultaneous reciprocation to introduction of operating fluid such as air into the actuator. Means such as a linkage for connecting the actuator to a valve is provided, such means being connected to the pistons interiorly thereof for minimizing the actuator size for a given required stroke. One of the pistons at a bearing surface thereof, rides on a guide means received interiorly of the piston thereby further enhancing the compactness of the actuator. The surface of the guide means is pressurized with the operating fluid applied to that one piston whereby risk of operating fluid leakage across that piston at the bearing surface thereof is substantially eliminated.

11 Claims, 1 Drawing Figure

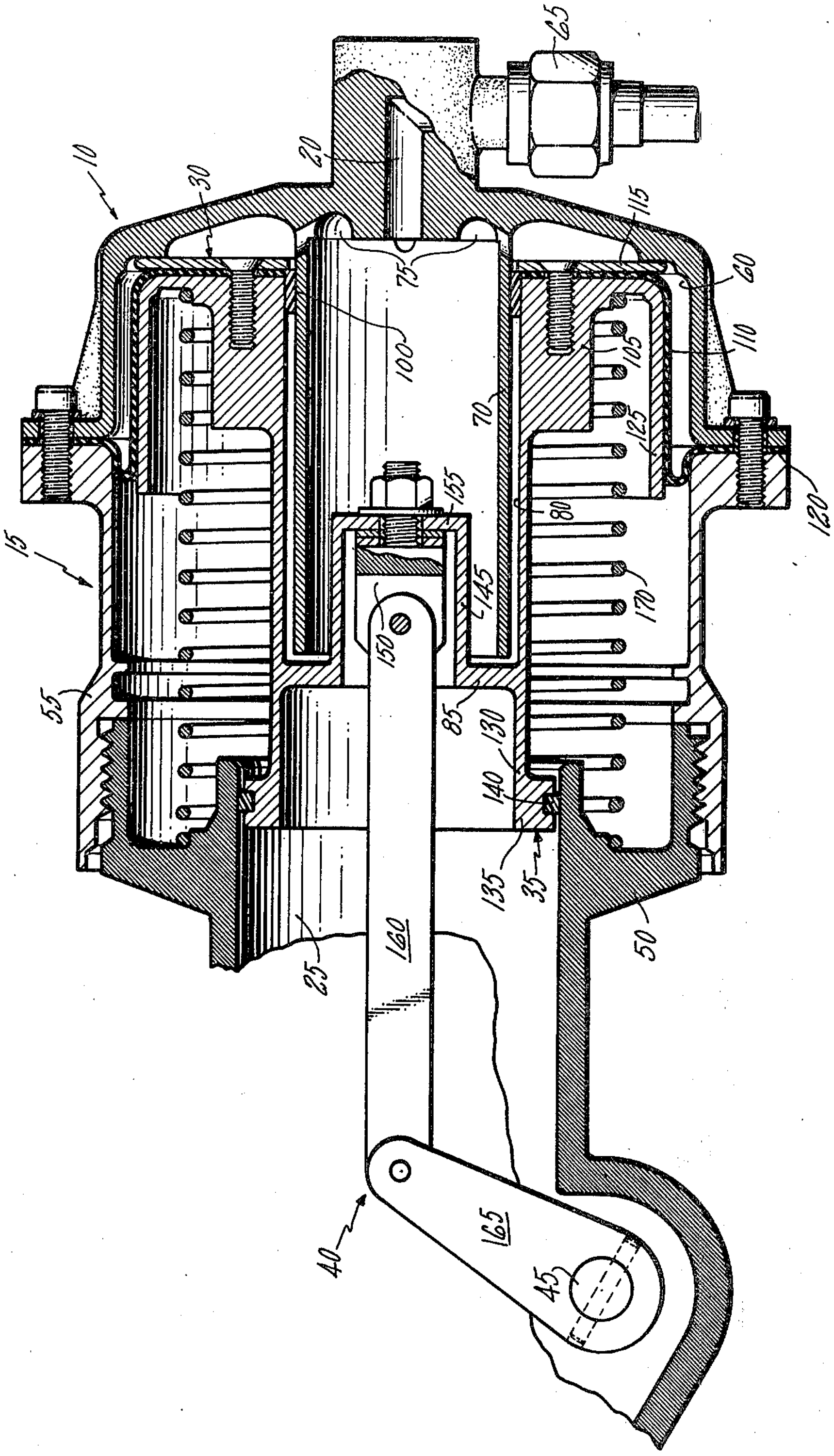
65
20
10
30
75
115
60
100
110
105
70
125
120
155
80
15
145
170
150
55
85
130
140
135
35
50
25
160
40
165
45

COMPACT VALVE ACTUATOR

DESCRIPTION

Technical Field

This invention relates to valve actuators, and more specifically to valve actuators employing a pair of simultaneously reciprocable pistons acted on by operating fluids of differing pressures.

Background Art

Fluid operated control systems for heating and air conditioning systems such as those disclosed in U.S. Pat. Nos. 3,149,474 to Goodman and 3,441,213 to Maher, Jr. and assigned to the assignee of the present invention, employ a flow control valve such as a butterfly valve or the like for controlling the flow of fluid through a supply line. Such valves are mechanically connected to and operated by fluid operated actuators which employ a pair of joined pistons each acted upon by an operating fluid, a smaller of the pistons being operated by high pressure supply fluid and the larger piston being operated by lower pressure servo fluid. Adjustment of the servo fluid pressure by the control system causes the pistons to move, thereby adjusting the valve in the supply line. This in turn alters the supply fluid pressure thereby balancing the actuator pistons in the required position thereof. More detailed descriptions of the operations of such actuators may be had from the aforementioned Goodman and Maher, Jr. patents.

Size constraints imposed upon such heating and air conditioning systems, especially on such systems employed in military and commercial aircraft dictate that such actuators be as compact as possible within the limits of the mechanical stroke required of such an actuator to operate the flow control valve. The enhancement in the compactness of such a valve actuator has been achieved by Cercone as documented in U.S. Pat. No. 3,525,289, assigned to the assignee of the present invention. As indicated in the Cercone patent, the compactness associated with the Cercone actuator is achieved primarily by the nesting of diaphragms which seal the pistons to the actuator housing, the area ratios afforded by the design of the piston assembly, and the dimensions of the pistons themselves.

While the Cercone actuator represents a significant improvement over the prior art fluid operated, dual piston valve actuators, advances in the compactness of the actuator, and the guidance of the pistons within the valve housing are continually being sought.

Accordingly, it is a principal object of the present invention to provide a compact fluid operated valve actuator which represents an improvement over the prior art.

It is another object of the present invention to provide such an actuator with enhanced compactness.

It is another object of the present invention to provide such a valve actuator with enhanced guidance of the actuator pistons within the housing.

Disclosure of the Invention

These and other objects, which will become more readily apparent from the following detailed description taken in connection with the appended claims and accompanying drawing are achieved by a compact valve actuator employing a pair of pistons, each responsive to operating fluid acting thereon by reciprocation within a housing. The pistons are connected to a valve operated by the actuator by means of a linkage which is joined to the pistons interiorly thereof between major portions of the reaction surfaces of the pistons thereby enhancing the compactness of the actuator. That piston responsive to low pressure or servo operating fluid is sealed to the actuator housing by a rolling diaphragm in a manner well known in the art. However, the high pressure piston, that responsive to the pressure of the supply fluid, is sealed to the actuator housing by a piston ring which, in addition to such sealing, provides a means by which the longitudinal alignment of that piston, with the actuator housing is accurately maintained. The low pressure or servo piston at a bearing surface thereof rides on a tubular guide means which further enhances the maintenance of the alignment of the piston with the housing. The servo fluid applied to the reaction surface of this piston is in part channeled thereto through the interior of the tubular guide means and over the surface thereof thereby establishing a constant pressure on both sides of the servo piston bearing surface, thus eliminating any risk of leakage of the servo fluid around the piston due to a pressure drop across the bearing.

Brief Description Of The Drawing

FIG. 1 is an elevation in section of the compact valve actuator of the present invention.

Best Mode For Carrying Out The Invention

Referring to the drawing, the compact valve actuator of the present invention is indicated generally at 10 and comprises a housing 15 provided with low and high pressure fluid inlets 20 and 25 respectively. Fluid admitted to the actuator through the low and high pressure inlets reciprocally drives first and second pistons 30 and 35 respectively, the pistons being in back-to-back orientation and coupled to linkage 40 which connects the operated valve (not shown) with the actuator by means of valve shaft 45.

Housing 15 comprises high pressure section 50 joined to median or ambient pressure section 55 by a threaded connection therewith, section 55 in turn being joined to low pressure end section 60 by a bolted flanged connection therewith. High pressure section 50 is disposed in fluid communication with a high pressure operating fluid, which may comprise the supply fluid from the conduit in which the operated valve is disposed, this operating fluid being admitted to the actuator through inlet 25 defined by the end of section 50.

Low pressure section 60 is provided at the end thereof with a fitting 65 through which servo fluid at a pressure substantially lower than the pressure of the high pressure operating fluid is admitted to the actuator interior. In general, this servo fluid is obtained from a tap of the supply conduit, the pressure of the servo fluid being lowered by a restriction in the tap. As shown, the servo fluid enters the actuator housing through low pressure inlet 20, and is channeled axially by tube or guide means 70 communicating directly with that inlet and radially outwardly from guide tube 70 to the end of first piston 30 through secondary inlets 75. As shown, guide tube 70 may be formed integrally with housing section 60 wherein secondary inlets 75 are formed by boring. However, it will be understood that the guide tube may also be formed separately from housing section 60 and attached thereto by any suitable method.

First or low pressure piston 30 is generally cup-shaped having an elongate cavity defined by the back wall 85 and a sidewall structure 80 outstanding therefrom. A bushing or bearing 100 disposed around the inner surface of sidewall structure 90 engages guide tube 70 as piston 30 rides reciprocally on bearing 100 therealong. Piston 30 also includes a radially outwardly extending flange 105 to which a flexible rolling diaphragm 110 is secured by a clamped engagement between flange 105 and annular diaphragm retaining plate 115 defining the piston end. The periphery 125 of the diaphragm is sealed to the actuator housing by the clamped engagement of a peripheral portion 120 of the diaphragm with the mounting flanges of housing sections 55 and 60. The flange terminates in an annular skirt 125 which guides the rolling diaphragm preventing jamming thereof throughout reciprocation of piston 30.

It will be observed that servo fluid applied to first piston 30 at the righthand face of back wall 85 and across the piston end or retaining plate 115 induces a leftward force on the piston. As shown, it will be seen that the depth of cavity 80 within piston 30 is greater than the length of guide tube 70 so that servo fluid admitted to the actuator through the guide tube pressurizes the outer bearing surface of the guide tube and the inner surface of the piston sidewall structure. Furthermore, servo fluid is also channeled into the gap between sidewall structure 80 and the bearing surface of tube 70 through secondary inlets 75. Thus, it will be appreciated that both sides of bearings 100 are maintained at the same servo fluid pressure so that leakage of servo fluid across the bearing is prevented. This is to be contrasted with various prior art fluid operated valve actuators wherein a pressure differential across a sliding piston bearing causes fluid leakage across the bearing. Servo fluid leakage at the periphery is also prevented due to the positive stationary seal at the clamped connection of the periphery 125 of diaphragm 110 with the mounting flanges of housing sections 55 and 60.

Second or high pressure piston 35, like piston 30 is cup shaped, sharing common back wall 85 with piston 30 and includes a sidewall structure 130 which terminates in a radially outwardly extending flange portion 135 defining the end of the piston. The lefthand faces of flange 135 and back wall 85 define the reaction surfaces of piston 35 against which high pressure operating or supply fluid pressure induces on the reaction surfaces urging piston 35 to the right. The periphery of flange 135 is provided with an annular channel within which is seated piston ring 140 which seals the supply fluid from ambient pressure maintained within median housing section 55. Piston 140 also provides further guidance for reciprocating pistons 30 and 35.

Back wall 85 is provided with a recessed portion 145 extending within cavity 80 of piston 30 and receivable within the interior of guide tube 70. A clevis 150 is bolted to the back wall 155 of recess 145, the clevis providing a fixture for pivotally joining connecting means 40 with the reciprocating pistons. As shown, means 40 comprises a pair of links 160 and 165 connecting the actuator pistons with valve shaft 45. However, it will be appreciated that various other linkages or equivalent connecting means may be employed without departing from this invention. It will thus be seen that the connecting means is joined to the pistons interiorly thereof between the piston ends. In other words, the point of connection between means 40 and the actuator is nested within guide tube 70 and within the pistons themselves. Therefore, it will be appreciated that for a given required stroke and linkage length, the longitudinal dimensions of the valve actuator are minimized, distinguishing this actuator from prior art actuators wherein the means connecting the actuated valve to the actuator pistons are attached to the pistons exteriorly rather than interiorly thereof.

In operation, the piston structure is biased to the right or toward the low pressure inlet by a coil spring 170. Servo fluid pressure acting on the diaphragm retention plate 115 and the right face of back wall 85 urges first and second pistons to the left against the bias of spring 170 and the pressure of high pressure operating or supply fluid acting on the end of piston 35 and the left face of back wall 85. A change in servo pressure from a value in which the pistons are maintained in static equilibrium will cause movement of the pistons effecting the rotation of shaft 45 thereby resetting the supply line valve which in turn adjusts the pressure of the supply fluid acting upon valve 35 to restore the static equilibrium conditions to the actuator pistons.

Accordingly, it will be seen that in featuring the nested orientation of the piston guide means and valve connections, the compact valve actuator of the present invention exhibits a compactness heretofore unknown in the prior art. The maintenance of a uniform pressure along the bearing surfaces of the servo piston prevent leakage of servo fluid between the inlet thereof and ambient. The use of a piston ring in sealing the high pressure piston to the actuator housing further enhances the guidance of the pistons provided by tube 70.

While there has been shown and described a single embodiment of the compact valve actuator of the present invention, it will be appreciated that from this description, various modifications may suggest themselves to those skilled in the art and it is intended by the appended claims to cover such modifications as fall within the true spirit and scope of this invention.

We claim:

1. Valve actuator comprising means adapted to operatively connect said actuator to an actuated valve, a housing having high and low pressure operating fluid inlets thereto, first and second pistons disposed in said housing and adapted to drive said connecting means; said first piston pressurized by low pressure fluid admitted to said housing through said low pressure inlet; said second piston being movable with said first piston and pressurized by high pressure fluid admitted to said actuator through said high pressure inlet, said first and second pistons being maintained in equilibrium at least in part by a force balance of said high and low pressure fluids acting thereon; said valve actuator further comprising means along which at least one of said first and second pistons is guided in reciprocal movement thereof, said at least one of said pistons including bearing means engaging said guide means, said guide means along the entire length thereof, and said bearing means on opposite sides thereof communicating with, and being uniformly pressurized by operating fluid from one of the fluid inlets corresponding to said at least one of said pistons uniform pressurization of said guide means and opposite sides of said bearing means minimizing leakage of said fluid between said at least one of said pistons and said guide means, and around said bearing means due to a pressure differential across said bearing means.

2. Valve actuator according to claim 1 wherein said one piston includes a reaction surface and an interior cavity and wherein said guide means comprises a tube having an outer bearing surface on which said one piston rides, said tube being nested within said cavity, said one fluid inlet communicating with said piston reaction surface and with said outer bearing surface of said tube by way of the interior thereof.

3. Valve actuator according to claim 2 wherein said pistons are operatively connected and aligned in a direction of travel thereof, and wherein said other piston includes a fluid reaction surface, a portion thereof being disposed interiorly of said one piston cavity and providing a fixture at which said other piston is joined to said connecting means.

4. Valve actuator according to claim 3 wherein said fixture is disposed radially inwardly of said guide tube whereby said fixture is receivable within the interior of said tube.

5. Valve actuator according to claim 4 wherein said fixture comprises a recess in the reaction surface of said other piston and said connecting means comprises a linkage received in part within and pivotally connected to said recess at a wall portion thereof.

6. Valve actuator according to claim 1 wherein said first piston is sealed at the periphery thereof to the interior of said housing by a rolling diaphragm fixed to said first piston and said housing.

7. Valve actuator according to claim 1 wherein said second piston is sealed at the periphery thereof to the interior of said housing by a piston ring carried by said second piston at an outer surface thereof.

8. Valve actuator according to claim 1 wherein said pistons are fixed with respect to each other and disposed within said housing in back-to-back orientation, each of said pistons being pressurized by operating fluid applied to the reaction surface thereof through one of said fluid inlets, said valve actuator further including means for connecting said pistons to a valve operated by said actuator, said connecting means being joined to said joined pistons interiorly thereof.

9. Valve actuator according to claim 8 wherein both of said pistons are generally of open, cup shape, having a common back wall to which said connecting means is attached, each of said pistons including a sidewall structure outstanding from said common back wall, and sealed to the inside of said housing.

10. Valve actuator according to claim 9 wherein the sidewall structure of said first piston is sealed to the inside of said housing by a rolling diaphragm connected to said housing and said first piston and wherein the sidewall structure of said second piston is sealed by a piston ring.

11. Valve actuator according to claim 10 wherein said guide means comprising a tube disposed centrally of the interior of said housing and received interiorly of at least one of said pistons such that said at least one piston is in sliding engagement with the surface of said tube, wherein said common piston back wall including therein a recess receivable within said guide tube, said connecting means comprises a linkage received at least in part within, and pivotally connected to said recess at a wall portion thereof.

* * * * *